UNITED STATES PATENT OFFICE.

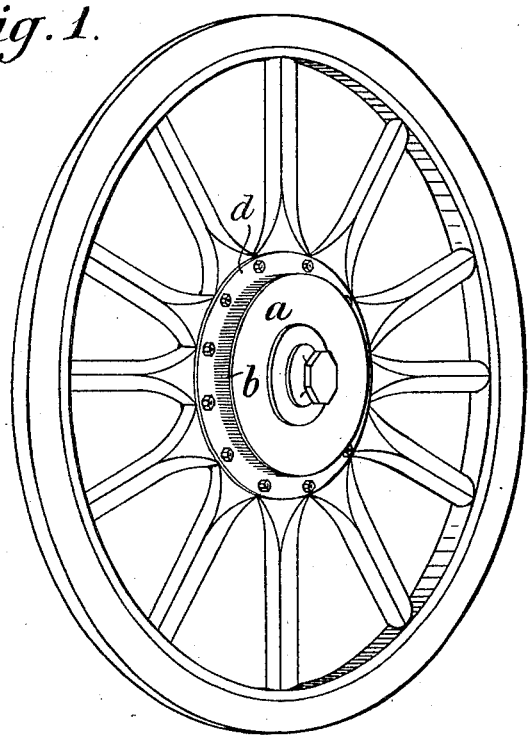

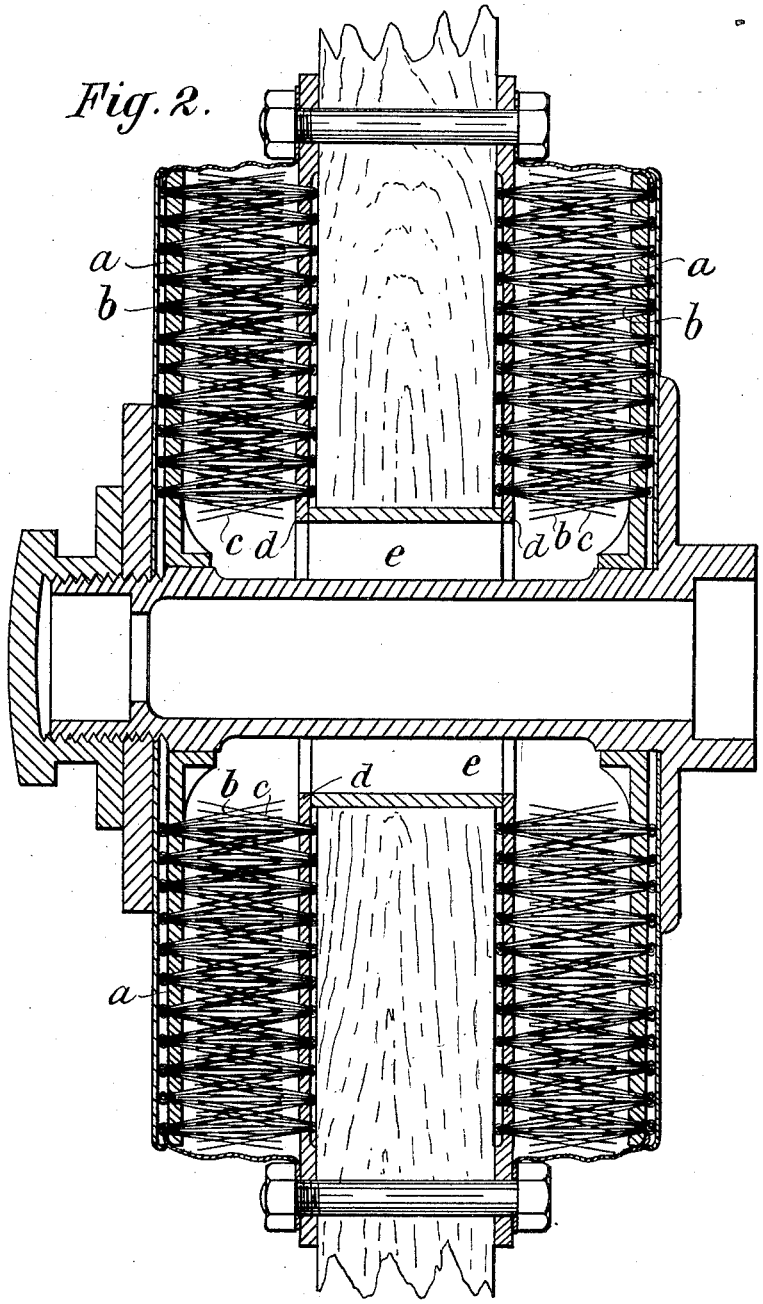

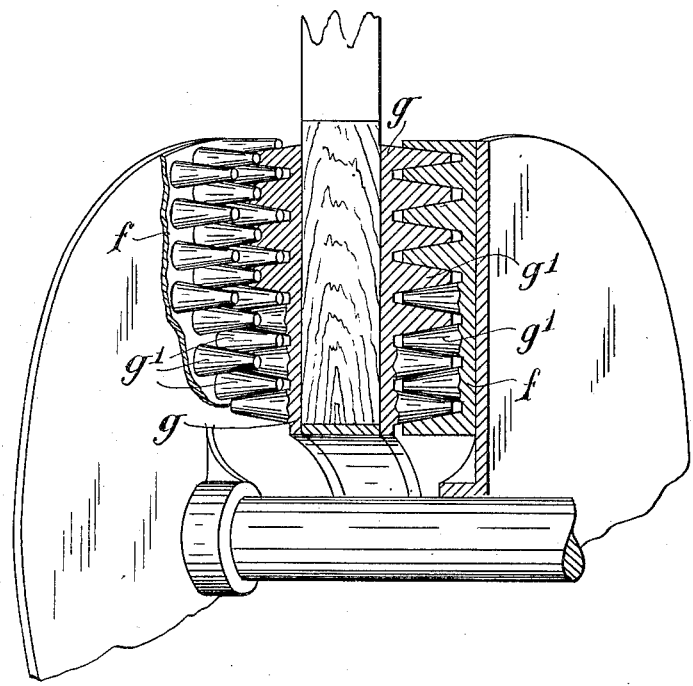

HENRY ALLEN PRYOR, OF LONDON, ENGLAND.

WHEEL FOR ROAD-VEHICLES.

1,082,170.  Specification of Letters Patent.  Patented Dec. 23, 1913.

Application filed February 5, 1912. Serial No. 675,643.

*To all whom it may concern:*

Be it known that I, HENRY ALLEN PRYOR, of 70 and 72 Chancery Lane, London, W. C., England, have invented certain new and useful Improvements in or Relating to Wheels for Road-Vehicles, of which the following is a specification.

This invention relates to wheels for road vehicles and has for its object to provide an improved construction of wheel which will absorb vibration and at the same time provide such resiliency as is required with or without a resilient tire to the wheel.

According to this invention the rim member of the wheel is connected to and supported from the hub member by intermeshing brush-like projections or surfaces preferably but not necessarily disposed transversely to the plane of the wheel so that the strains and vibration between the rim member and the hub member are distributed over a multitude of projections or brush-like intermeshing members.

The accompanying drawings show one example of a wheel made in accordance with this invention, Figure 1 being a perspective view of a complete wheel; and Fig. 2 a sectional elevation through the hub thereof. Fig. 3 is a sectional view showing a modified form of the device.

In the example illustrated the hub member of the wheel consists of two plates or disks *a a* disposed parallel to the plane of the wheel and provided with brush-like projections *b* on their inner surfaces extending partially or wholly over the disk, the bristles of the brush projecting inward so as to pass in between or intermesh with similar brush-like projections *c* on a central disk *d d* mounted on the rim member of the wheel made with spokes in the usual way. The central aperture in the rim member is made large enough to allow of the passage of the axle with sufficient clearance at *e* to permit of relative movement between the hub and rim members.

What may be termed the bristle of the brush-like members are forced into or between the other for a suitable distance so as to intermesh and give such a connection between the hub member and the rim member that the rim member will be adequately supported both against lateral and vertical or other strains without the necessity for any other connection and whereby also the driving torque in the case of a driving wheel can be transmitted through the intermeshing brush-like members this being possible by the clutch-like action of the intermeshing parts.

The bristle or projections of the brush-like surfaces may be of ordinary wire or similar material from which metal brushes are usually made and mounted in the same or a similar manner.

Tempered steel or other metal wire may be used and in certain modifications the projections may be in the form of rubber studs or projections of suitable size and shape or other material may be used. One such modification is shown in Fig. 3 where there is substituted for the brushes rubber disks *g* and *f* having a multitude of projections *g'*, the projections on one brush intermeshing with the corresponding projections on the other.

Suitable means may be provided for preventing the access of dirt and water to the intermeshing surfaces, for example, flexible coverings or overlapping metal cases may be used.

What I claim and desire to secure by Letters Patent is:—

1. A vehicle wheel consisting of a hub member having a multitude of transversely disposed bristles or projections mounted thereon and a rim member having similar bristles intermeshing with and obtaining support from the bristles or projections on the axle or hub member.

2. A wheel for vehicles consisting of hub and rim members capable of relative movement in the plane of the wheel in combination with brushes disposed in the plane of the wheel with the bristles transversely thereto and mounted on the overlapping parts of said relatively movable members and means whereby the said brushes are kept in intermeshing engagement so as to support the one member of the wheel from the other.

In testimony whereof I have signed my name to this specification in the presence of two subscribing witnesses.

HENRY ALLEN PRYOR.

Witnesses:
 ALFRED B. CAMPBELL,
 ROLAND TURNER.

---

Copies of this patent may be obtained for five cents each, by addressing the "Commissioner of Patents, Washington, D. C."